United States Patent [19]

Fukatsu

[11] Patent Number: 4,953,086

[45] Date of Patent: Aug. 28, 1990

[54] MONEY EXCHANGING MACHINE FOR EXCHANGING FIRST AND SECOND NATIONS' CURRENCIES BY SORTING, STORING AND PAYING OUT THE CURRENCIES

[75] Inventor: Kunio Fukatsu, Ebina, Japan

[73] Assignee: Kabushiki Kaisha Toshiba, Kawasaki, Japan

[21] Appl. No.: 175,314

[22] Filed: Mar. 30, 1988

[30] Foreign Application Priority Data

Mar. 31, 1987 [JP] Japan .................................. 62-78672

[51] Int. Cl.$^5$ ....................... G06F 15/21; G07D 13/00
[52] U.S. Cl. ...................................... 364/408; 235/379
[58] Field of Search .......................... 364/408; 235/379

[56] References Cited

U.S. PATENT DOCUMENTS

| | | | |
|---|---|---|---|
| 4,251,867 | 2/1981 | Uchida | 364/408 |
| 4,310,885 | 1/1982 | Azcua | 364/405 |
| 4,804,830 | 2/1989 | Miyagisima | 235/379 |

FOREIGN PATENT DOCUMENTS 0182244  5/1986  European Pat. Off. .
2046491  11/1980  United Kingdom .

Primary Examiner—Jerry Smith
Assistant Examiner—Gail O. Hayes
Attorney, Agent, or Firm—Cushman, Darby & Cushman

[57] ABSTRACT

A money exchanging machine for performing exchange between the Japanese yen and the U.S. dollar, the machine having a bills opening in which the yen and dollar bills are received. The machine comprises a checking section for storing the yen and dollar bills received through the bills opening in denominations of 10,000 bills, $10 bills and other bills, and a sorting conveyor mechanism including a conveyor passage and a sorting gate. The machine further comprises a first storing section for storing the 10,000 bills sorted by the sorted by the sorting conveyor mechanism, a second storing section for storing $10 bills sorted by the sorting conveyor mechanism, and a third storing section for storing bills other than the 10,000 and $10 bills sorted by the storing conveyor mechanism. The 10,000 bills stored in the first storing section and the $10 bills stored in the second storing section are paid as exchanging currencies.

17 Claims, 11 Drawing Sheets

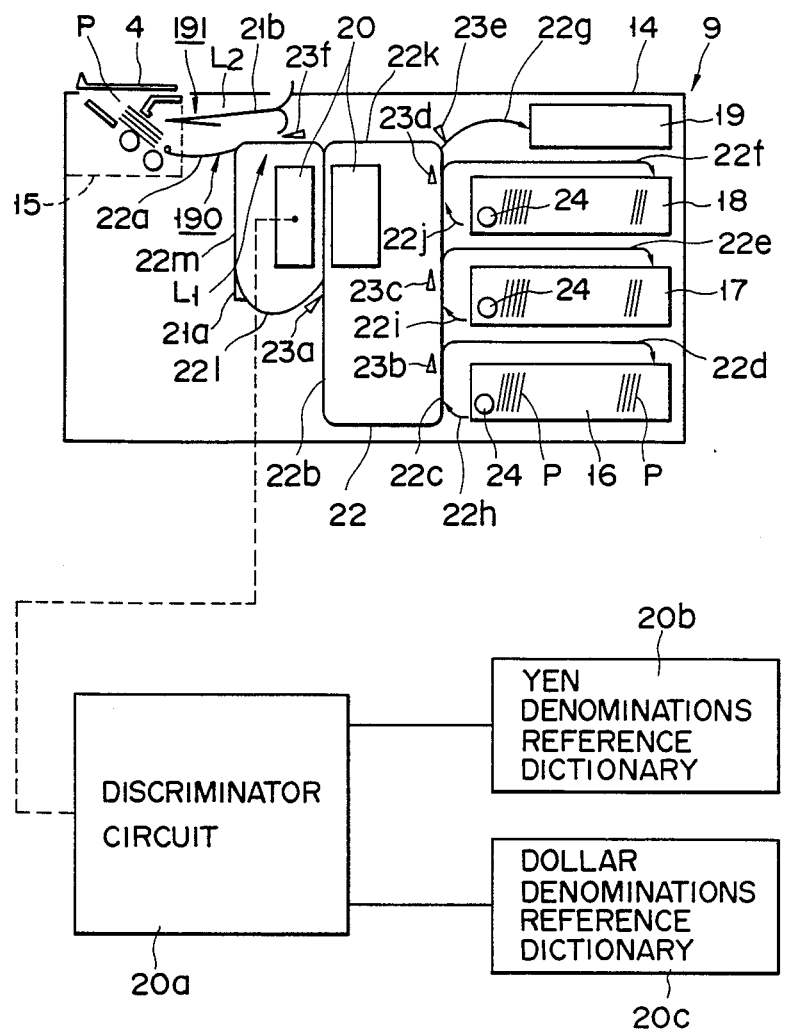
F I G. 3

Please Select Language.

[ 日本語 ]　[ ENGLISH ]

FIG. 8B

PLEASE SELECT THE
TRANSACTION YOU WISH TO
PERFORM.

[ TRANSACTION AMOUNT ]
[ EXCHANGE ¥ → $ ]
[ EXCHANGE $ → ¥ ]

FIG. 8C

TODAY'S EXCHANGE RATES
$10 = ¥1,650
¥10,000 = $60.6

PRESS "O" IF YOU
WISH TO CARRY OUT
THE EXCHANGE,
OR "X" IF YOU DO NOT
WISH TO CONTINUE.

INSERT THE "¥" BILLS
YOU WISH TO EXCHANGE.

INSERT YOUR CARD IF YOU
WISH THE EQUIVALENT OF
THIS SUM TO BE DEBITED
FROM YOUR ACCOUNT.

MONEY EXCHANGING MACHINE FOR EXCHANGING FIRST AND SECOND NATIONS' CURRENCIES BY SORTING, STORING AND PAYING OUT THE CURRENCIES

BACKGROUND OF THE INVENTION

1. Field of the Invention

The present invention relates to a money exchanging machine capable of automatically exchanging nations' currencies for a nation without clerical supervision when people enter or leave of the nation.

2. Description of the Related Art

Overseas travelers and visitors from foreign countries have been increasing more and more these days. These travelers and visitors need to exchange their currencies when they enter or leave the nation. This currency exchange is available at banks in the airport and hotels. Money exchanging services at the front of these banks and hotels include calculating various sums of money to be exchanged according to every day's exchange rates, paying money according to the complicated combinations of the kinds of currency and the desired denominations. Systems may be. These are extremely troublesome.

The inventor of the present invention discloses in his Japanese Patent Publication Sho 60/14389, for example, a money exchanging machine capable of automatically exchanging nations' currencies when operated by the users, thus saving attendants and preventing mistakes.

The above-mentioned money exchanging machine, however, is limited to exchanging "yen" for "dollar" or "dollar" for "yen". This machine therefore needs various devices in order to satisfy various needs of the users. Such a combination, however, results in a complicated apparatus which cannot be easily operated by the users.

When the machine is designed to have both functions of exchanging "yen" for "dollar" and "dollar" for "yen", it needs units for receiving and paying "Yen", and units for receiving and paying "dollar". The resulting apparatus is expensive and complicated in construction.

SUMMARY OF THE INVENTION

The object of the present invention is therefore to provide a money exchanging machine, lower in cost, simpler in construction, and capable of exchanging first and second nations' currencies and being easily operated by the users.

According to an aspect of the present invention, there is provided a money exchanging machine for exchanging first and second nations' currencies comprising means for receiving the first and second nations' currencies; means for sorting the first nation's currency bills received by the receiving means and which have a specified face value, the first nations' currency bills being sorted to first currency bills, for storing the second nation's currency bills received by the receiving means and which have a specified face value to second currency bills, and for storing any currency other than the first and second currency bills to third currency; first means for storing the first currency bills sorted out by the sorting means; second means for storing the second currency bills sorted out by the sorting means; third means for storing the third currency sorted out by the sorting means; and means for paying an amount in the second nation's currency, equivalent to the received amount in the first nation's currency when the first nation's currency is received by the receiving means, said paying means paying an amount in the first nation's currency, equivalent to the amount in the second nation's currency, when the second nation's currency is received by the receiving means, said paying means capable of paying, as exchanging currency, the first bills stored in the first storing means and the second currency bills stored in the second storing means.

BRIEF DESCRIPTION OF THE DRAWINGS

FIG. 3 shows a bills processing unit employed by the money exchanging machine shown in FIG. 1;

FIGS. 8A through 8H show displays in the course of the exchanging operation shown in FIGS. 7A and 7B.

DETAILED DESCRIPTION OF THE PREFERRED EMBODIMENTS

Figure 1:
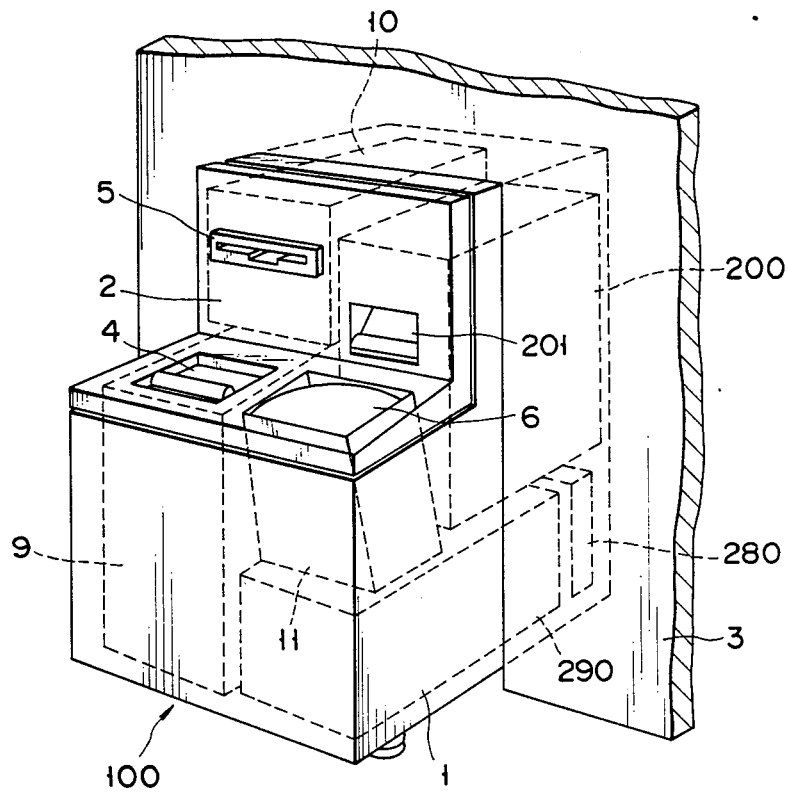
FIG. 1 is a perspective view showing an example of the money exchanging machine according to the present invention.

Reference numeral 100 in FIG. 1 represents an example of the money exchanging machine according to the present invention. This money exchanging machine 100 can automatically carry out the receipt and payment of money responsive to the operation of users. Money exchanging machine 100 has box body 1 installed in such a way that operating face 2 at the front face of box body 1 faces a corner of the bank where receipts and payments of money are automatically carried out. Box body 1 passes through partition wall 3 of the bank.

Operating face 2 is provided with bills opening 4 through which bills or valuable securities to be received (or to be exchanged) are inserted and through which bills to be discharged (or to be paid) are picked up from inside the box body. Operating face 2 is also provided with: coins entering and entering opening 201 through which coins to be received are fed and coins discharged from inside box body 1 are picked up; cards/bankbooks opening 5 through which transaction media such as IC cards, which serve as the cash cards, and bankbooks are fed and discharged at the time when the bills are received and paid; and display/input screen 6 which provides displays necessary for the users to deposit money and to have money paid. Box body 1 houses: bills processing unit 9 for processing those bills which are received and paid through bills opening 4; coins processing unit 200 for processing those coins which are received and paid through coins opening 201; cards/bankbooks processing unit 10 for processing those cards or bankbooks fed through cards/bankbooks opening 5; display/input unit 11 for applying predetermined displays and inputs to display/input screen 6; person-in-charge operating unit 280 which is operated by authorized persons; and control unit 290 for controlling each processing unit.

Figure 2:
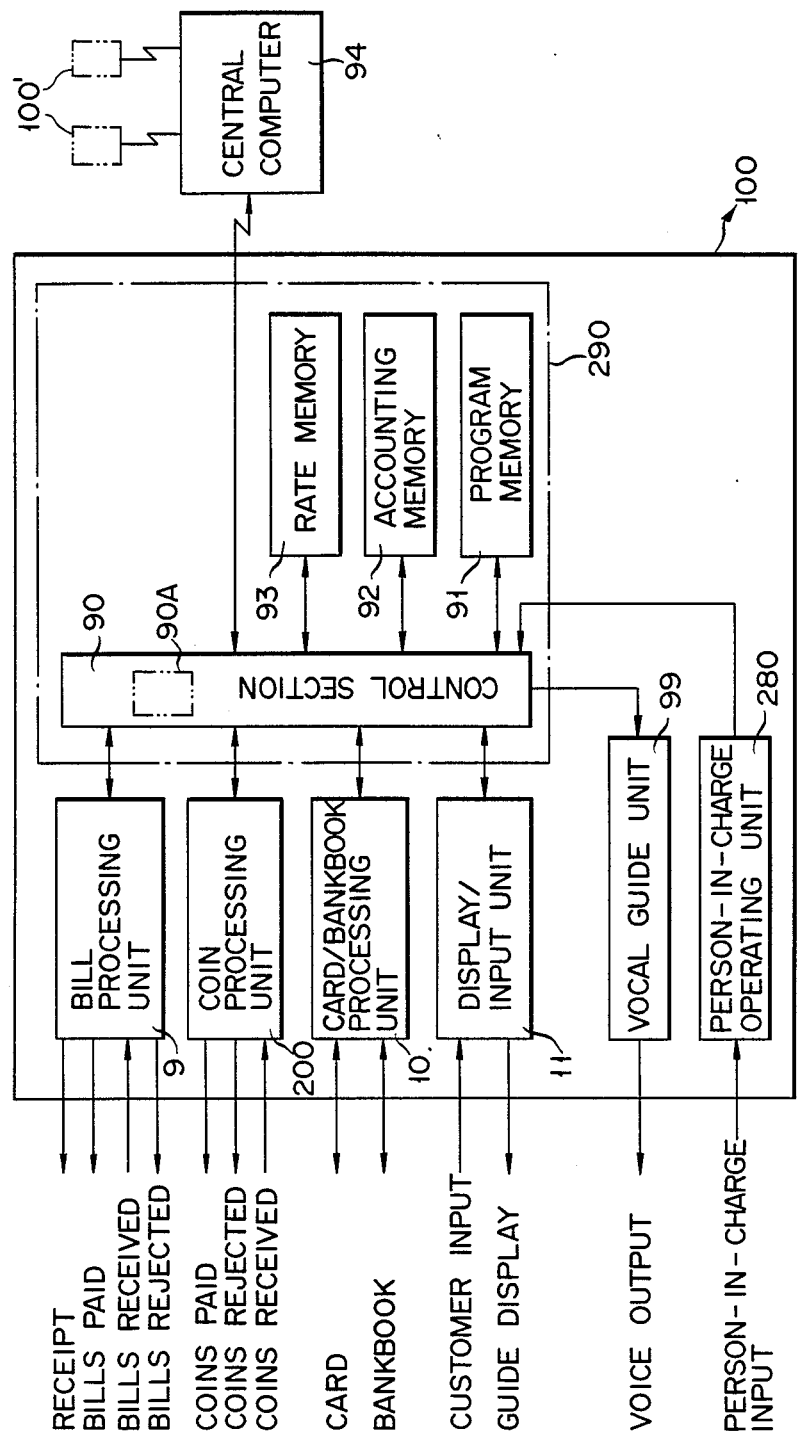
FIG. 2 is a block diagram showing an arrangement of the money exchanging machine shown in FIG. 1.

FIG. 2 is a block diagram showing an arrangement of money exchanging machine 100. Reference numeral 290 denotes the control unit, which includes: program memory 91 in which a predetermined program is stored; memory means 92 (which will also be hereinafter referred to as accounting memory) for storing transaction records about every transaction done through money exchanging machine 100, e.g., the total of money received and paid; rate memory 93 in which the most current exchange rates (which will be hereinafter referred to as exchange rates, too) are stored; and control section 90 to which these memories 91, 92 and 93 are connected. Also connected to control section 90 are tills processing unit 9, coins processing unit 200, cards/bankbooks processing unit 10, display/input unit 11, person-in-charge operating unit 280 and vocal guide unit 99 for vocally guiding the customers. Control section 90 is connected to and communicated with central computer 94 through ar exclusive or exchanging circuit. Therefore, communications are done between money exchanging machine 10 and central computer 94, relating the account number read from the card or bankbook which is fed into cards/bankbooks processing unit 10, the limit of allowable sum previously registered in central computer 94 on this account number or key word, and the account number or key word inputted through display/input unit 11. A transaction is made once the data has been communicated. Reference numeral 100' denotes other money exchanging machines connected to and communicating with central computer 94, these money exchanging machines 100' having the same arrangement as that of money exchanging machine 100.

Time means 90A uses the timing function of control section 90 to discriminate the picking-up of coins which will be described later.

An arrangement of bills processing unit 9 will be described with reference to FIG. 3. Arranged at a front (or left) upper corner of box 14 of bills processing unit 9 is receiving section 15 for receiving inserted (or received) or discharged bills P in a pile, receiving section 15 facing opening 4 used for the adding and discharge of bills. Arranged at the rear (or right side) in bills processing unit 9 are received bills storing section 16 in which received broken bills, not-exchangeable yen and dollar bills are mixedly stored; ten-dollar bills storing section 17 in which paying and exchanging ten-dollar bills and received ten-dollar bills (except broken ones) are stored, ten-thousand-yen bills storing section 18 in which paying and exchanging ten-thousand-yen bills and received ten-thousand-yen bills (except broken ones) are stored, and collection vessel 19 in which bills mistakenly left are stored.

Further arranged in box 14 are section 20 for checking received or discharged bills P; first and second conveyer sections 21a and 21b for conveying bills in a pile while keeping them shifted from every preceding one at their front ends; and bills conveying passage 22 on which bills P are conveyed to any of the sections. Distributing gates 23a–23f whose driver source is a rotary solenoid (not shown) are arranged at branched portions of bills conveying passage 22. Bills detectors (not shown) are also arranged on the way of bills conveying passage 22.

Checking section 20 includes yen denominations reference dictionary 20b in which various kinds of data (or reference patterns) relating to yen bills are stored, dollar denominations reference dictionary 20c in which various kinds of data (or reference patterns) relating to dollar bills are stored, and discriminator circuit 20a for comparing various kinds of patterns with reference patterns relating to the front and back of received or discharged bill P to determine what kind of bills it belongs to and also to discriminate whether it is a true bill or counterfeit one.

Bills conveying passage 22 has take-in conveyer passage 22a whose base starts from storing section 15. Conveyor passage 22a is connected to central conveyer passage 22b, on the way of which is located checking section 20. Central conveyer passage 22b is connected to sorting conveyer passage 22c which runs along bills storing sections 16, 17 and 18.

Conveyor passages 22d, 22e, 22f and 22g which serve to feed bills P respectively to bills storing sections 16, 17, 18 and collection vessel 19, are branched from sorting conveyor passage 22c. Conveyor passages 22h, 22i and 22j, which serve to convey bills P picked up through pick-up mechanisms 24 in respective bills storing sections 16, 17 and 18 are connected to sorting conveyor passage 22c. Pick-up mechanism 24 in received bills storing section 16 is left inoperative because storing section 16 is intended only for received bills.

The base of central conveyor passage 22b is connected to the terminal end of sorting conveyor passage 22c through connecting conveyor passage 22k. Conveyor passage 22, which serves to convey bills P to first conveyor section 21a, is branched from central conveyor passage 22b. Feeding conveyor passage 22m, which serves to convey bills P at first conveyor section 21a to receiving section 15, is located on the way of branched conveyor passage 22.

It is assumed that the bills conveying line extending from receiving section 15 to checking section 20 is called first conveyor passage $L_1$ and that the conveyor means for conveying the bills over first conveyor passage $L_1$ is designated first conveyor means 190. It is also assumed that the bills-conveying line extending from first conveyor section 21a to receiving section 15 via a part of take-in conveyor passage 22a, feeding conveyor passage 22m and second conveyor section 21b is called second conveyor passage $L_2$ and that the conveyor means for conveying the bills over second conveyor passage $L_2$ is called second conveyor means 191.

The flow of bills P at the time when they are received in the money exchanging machine will be described. Bills P which are inserted in a bundle into bills entering and emerging opening 4 are successively taken in one by one by a take-in/feed mechanism in receiving section 15 which faces opening 4, and then fed onto central conveyor passage 22b through take-in conveyor passage 22a. The bills are checked by checking section 20 about their face value (or kind of money) and about their truth while they are being coveyed the central passage 22b.

When the bills are discriminated to be true, they are fed from central passage 22b to sorting conveyor passage 22c where they are selectively sorted out by sorting gates 23b, 23c and 23d.

When dollar bills are received, for example, they are checked at checking section 20, using dollar denominations reference dictionary 20c, and ten-dollar bills suitable for exchange payment are stored in ten-dollar bills storing section 17, while other dollar bills are stored in received bills storing section 16.

When yen bills are received, checking is carried out at checking section 20, using yen denominations reference dictionary 20b, and ten-thousand-yen bills suitable for exchange payment are stored in ten-thousand-yen bills storing section 18, while other yen bills are stored in received bills storing section 16.

When the bills are discriminated to be counterfeit, they are sorted out to branched conveyor passage 22 by means of sorting gate 23a and then accumulated at first conveyor section 21a through branched conveyor passage 22. Sorting gate 23a and branched conveyor passage 22 are an example of the conveyor changeover means.

When it is detected by a detector (not shown) that no bill P is present at opening 4, the temporarily-accumulated counterfeit bills are conveyed, as bills P to be rejected, to opening 4 via feed conveyor passage 22m.

Namely, P which are inserted into bills opening 4 are checked by checking section 20 in bills processing unit 9. Ten-dollar bills suitable for exchange payment are stored in ten-dollar bills storing section 17, ten-thousand-yen bills suitable for exchange payment are stored in ten-thousand-yen bills storing section 18, and all other kinds of money are stored in section 16. Exchange transactions are thus made possible due to the re-cycle of received bills P, although only opening 4 through which bills P are inserted is provided and the number of bills storing sections 16, 17 and 18 is the smallest. Thus, the money exchanging machine can be made lower in cost and simpler in construction.

The flow of bills P at the time when they are paid will be described. According to customer's input relating to the kind of money to be exchanged, that is, whether the bills to be paid should be ten-thousand-yen or ten-dollar bills and how many they should be paid, the requested bills are successively picked up from ten-thousand-yen bills storing section 18 and ten-dollar bills storing section 17 by means of pick-up mechanisms 24 and fed onto sorting conveyor passage 22c via pick-up conveyor passages 22j and 22i. Advancing on sorting conveyor passage 22c, the requested bills are fed onto central conveyor passage 22b via connecting conveyor passage 22k. It is thus checked by checking section 20 whether the requested bills are skewed or not, and whether they are double-piled or not. It is also discriminated by yen or dollar denominations reference dictionary 20b or 20c whether the requested bills are payable or not.

Bills P which have been discriminated to be payable are sorted out to branched conveyor passage 22 by means of sorting gate 23a, then to first conveyor section 21a, then accumulated at second conveyor section 21b. When all of bills P are picked up, they are paid in a bundle through bills entering and emerging opening 4.

Bills P which are discriminated not to be payable because they are skewed or double-piled advance straight on central conveyor passage 22b without being sorted by sorting gate 23a and come to sorting conveyor passage 22c. Bills P are then sorted out to the lowest storing conveyor passage 22d by means of sorting gate 23b and stored in received bills storing section 16.

When some of tills P are mistakenly left at bills receiving section 15 at the time of their being received and paid, they are conveyed from take-in conveyor passage 22a to the uppermost storing conveyor passage 22g via central and sorting conveyor passages 22b and 22c and then stored in collection vessel 19.

Figure 4A:
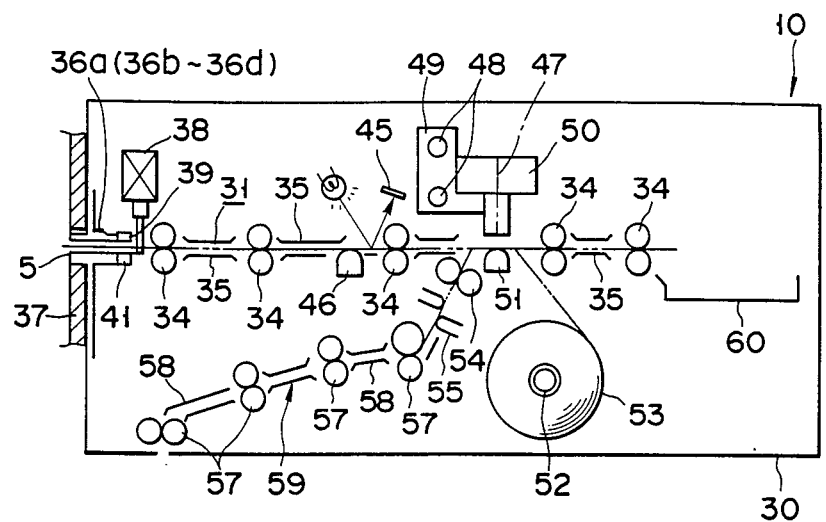
FIGS. 4A and 4B show a cards/bankbooks processing unit employed by the money exchanging machine shown in FIG. 1.
Figure 4B:
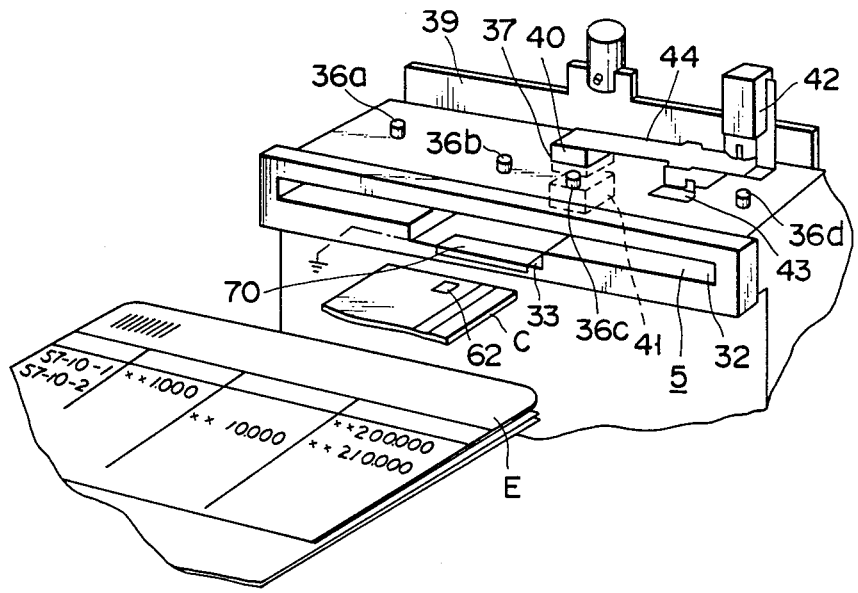

An arrangement of cards/bankbooks processing unit 10 which uses IC cards and magnetic bankbooks (which will be hereinafter referred to as bankbooks) as its transaction media will be described with reference to FIGS. 4A and 4B. Reference numeral 30 represents a box having an opening opposite cards/bankbooks opening 5. Conveyor passage 31 extends in a straight line from cards/bankbooks opening 5 into box 30. Cards/bankbooks opening 5 has slit 32 substantially equal to the traverse width of bankbook E and groove 33 substantially equal to the traverse width of IC memory card C.

Conveyor passage 31 comprises plural pairs of rollers 34 and plural pairs of guide plates 35. Arranged at one end of conveyor passage 31 located on the side of cards/bankbooks opening 5 are optical sensors 36a–36d, card reading section 37 relative to IC memory cards C, and shutter 39 for opening and closing conveyor passage 31 responsive to solenoid 38.

Card reading section 37 has contact face 40, located above conveyor passage 31, and receiving table 41 to which contact pressure is applied. Contact face 40 is attached to support lever 44 which is swung around shaft 43 by means of solenoid 42.

Arranged behind shutter 39 or on the way of conveyor passage 31 are sensor 45 of the reflector type for detecting the page mark and printed letters of bankbook E, and magnetic head 46 for reading the magnetic stripe of bankbook E. Further, printing device 47 is arranged behind sensor 45 and magnetic head 46.

Printing device 47 includes printing head 50 mounted on carriage 49 which is guided by guide shafts 48 to freely reciprocate in a direction perpendicular to conveyor passage 31, and anvil 51 located along the moving direction of printing head 50. The drawn-out portion of roll paper 53 which is attached to reel 52 is hung around anvil 51 and then held between a pair of feed rollers 54 located under conveyor passage 31, so that the paper can be successively drawn out when paired rollers 54 are rotated. Arranged adjacent to paired rollers 54 in the direction in which roller paper 53 is drawn out is cutter 55 for cutting the printed roll paper. Cut roll paper 53 or receipt (which will be hereinafter referred to as statement, too) is conveyed to bills opening 4 of bills processing unit 9 via statement conveyor passage 59 which is a payment statements supply means comprising a pair of conveyor rollers 57 and a pair of guide plates 58.

Arranged at the other end of conveyor passage 31 located opposite to cards/bankbooks opening 5 is collection tray 60 in which transaction media such as IC memory cards C, bankbooks E and statements which are mistakenly left by the customers are stored.

When IC memory card C, for example, is inserted into cards/bankbooks entering and emerging opening 5, only optical sensors 36b and 36c are made blind. Shutter 39 is left closed in this case and memory card C is positioned when its front end strikes against shutter 39. Solenoid 42 is then made operative and support lever 44 is swung around shaft 43. Contact face 40 attached to the front end of support lever 44 is thus press-contacted and forms an electrical connection with contact portion 62 of IC memory card C, thereby enabling signals to be supplied and received.

When bankbook E is inserted, all of optical sensors 36a–36d are made blind. Shutter 39 is opened in this case and the driver system for conveyor passage 31 is made operative. Bankbook E is thus taken in while allowing its page mark and printed letters to be read by reflector type sensor 45 and printing is then applied to a blank portion of bankbook E by printing device 47.

Earthed conductor 70 is attached to groove 33 of cards/bankbooks opening 5. When conductor 70 contacts a conductor coated on the backside of inserted IC memory card C, static electricity which gives the IC cards bad influences can be removed.

Figure 5A:
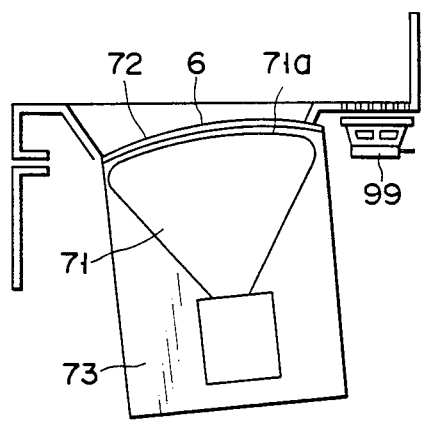
FIGS. 5A through 5D show a display/input unit employed by the money exchanging machine shown in FIG. 1.
Figure 5B:
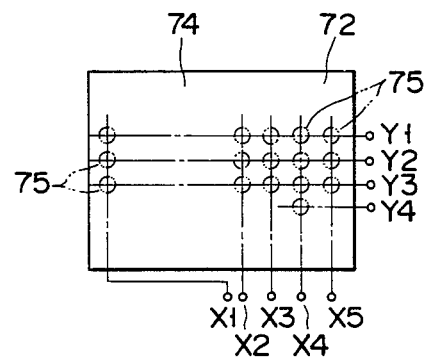

An arrangement of display/input unit 11 will be described with reference to FIGS. 5A-5D. Display/input unit 11 includes CRT 71 (or screen display means) which serves as an operation guide means, and transparent key board 72 arranged to cover screen 71a of CRT 71 and to serve as an input means, as shown in FIG. 5A. CRT 71 and transparent key board 72 are housed in casing 73. As shown in FIG. 5B, transparent key board 72 includes transparent plate 74 and transparent electrodes 75 embedded in transparent plate 74. A matrix circuit of $X_1$-$X_5$ and $Y_1$-$Y_4$ is formed in the case of key board 72. Therefore, outputs can be obtained responsive to those portions of the screen which are pressed by the customers. Transparent plate 74 has a curvature substantially the same as that of screen 71a of CRT 71, thereby enabling parallax to be prevented.

Figure 5D:
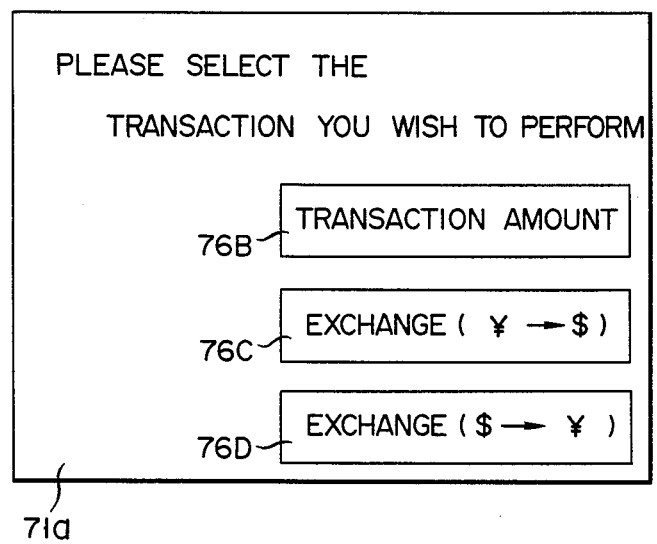
Figure 5C:
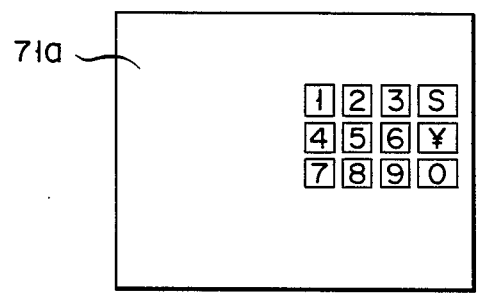

Transparent key board 72 is used as ten keys when screen 71a of CRT 71 is displayed as shown in FIG. 5C, for example, but it can be changed to perform other functions when screen 71a is displayed differently. As shown in FIG. 5D, for example, instructions ("Please select the transaction you wish to exchange") are displayed on screen 71a to assist customers to select their transaction mode: first statement 76B permits the customers to state what sum they wish to exchange; second statement 76C permits the customers to select the exchange of yen to dollar, and third statement 76D permits the customers to select the exchange of dollar to yen.

Figure 6:
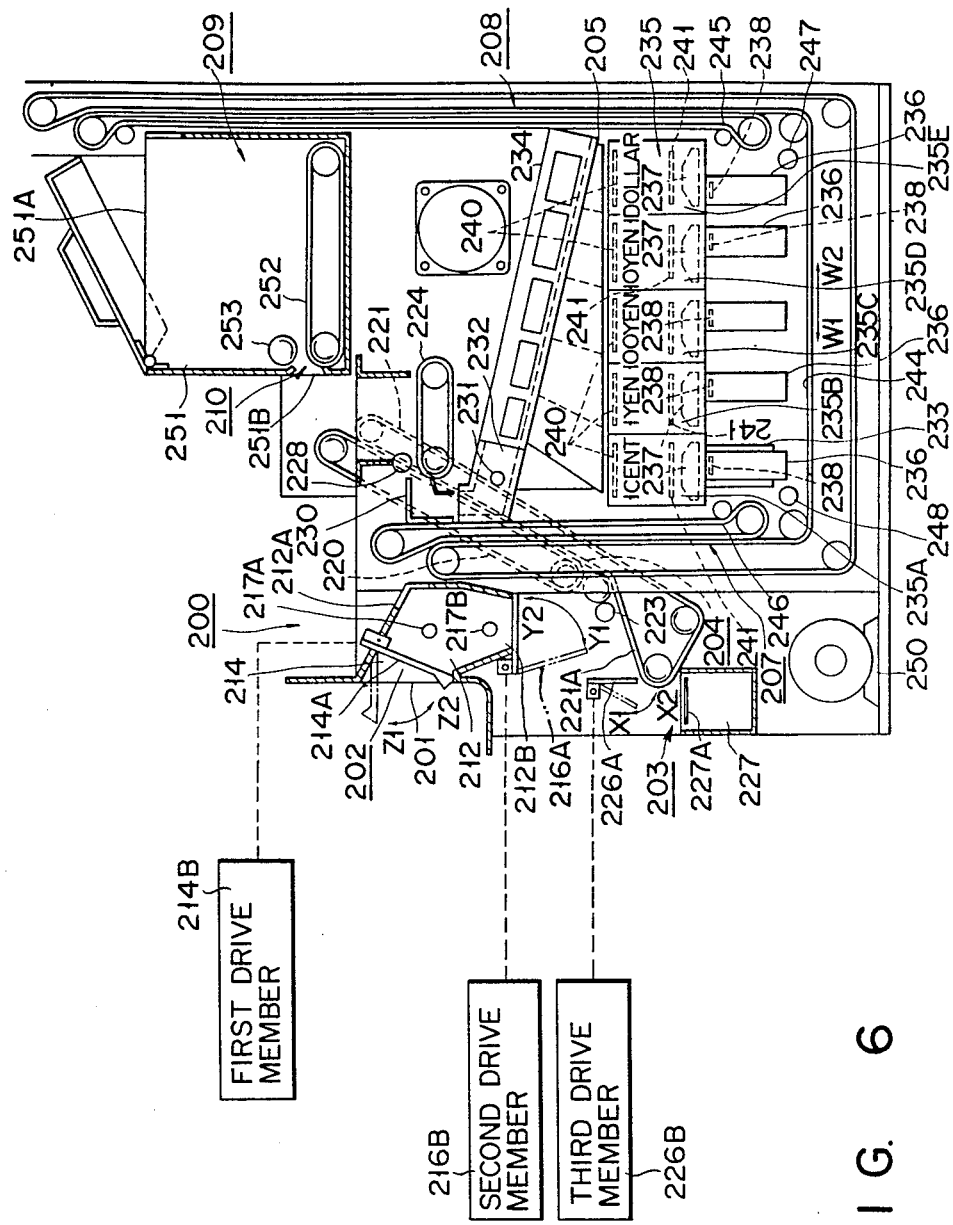
FIG. 6 is a sectional view showing a coins processing unit employed by the money exchanging machine shown in FIG. 1.

FIG. 6 shows an arrangement of coins processing unit 200. Coins processing unit 200 comprises section 202 for introducing those coins which are thrown in or picked up through coins opening 201, section 203 for storing coins which are mistakenly left at section 202 by the customers; conveyor passage 204 for conveying upward those coins which are thrown in section 202 by the customers; section 205 for storing coins according to their kinds when the coins which are conveyed upward by conveyor passage 204 are guided downward due to their own weights; conveyor passage 207 for conveying a desired sum of coins, which are collected from storing section 205 as coins to be paid, to section 202; conveyor passage 208 for conveying those coins, which are gathered from storing section 20, upward for collection; section 209 for receiving and storing those coins which are conveyed on conveyer passage 208; auxiliary conveyer passage 210 for conveying those coins, which are gathered as supplement coins from storing section 209, to receiving conveyor passage 204, and the like. Therefore, the processes of storing those coins, which are thrown in through coins entering and emerging opening 201, in storing section 205; of gathering a desired sum of coins from storing section 205 and introducing them to section 202; of collecting coins from section 205 to section 209 in case of necessity; and of supplementing coins stored in section 209 to section 205 in case of necessity can be achieved when the unit is operated by the customers or person in charge.

Coins introducing section 202 includes space 212 communicated with coins opening 201 to introduce thrown-in coins. Space 212 is defined by partition frames. Coins introducing section 202 is provided with coins discharging opening 211A at the rear side thereof and opposite to coins opening 201, and also with coins falling opening 212B at the bottom thereof. Coins opening 201 is provided with coin gate mechanism 214 comprising coin gate 214A which is pivoted and freely movable in directions $Z_1$ and $Z_2$, and first drive member (or rotary solenoid, for example) 214B for driving coin gate 214A to be opened and closed. Coins falling opening 212B is provided with coins-mounted member 216A on which coins thrown in through coins opening 201 and coins discharged through coins discharging opening 212A are mounted. Coins-mounted member 216A is pivoted to freely swing in directions $Y_1$ and $Y_2$ and is controlled by a drive member (which will be hereinafter referred to as second drive member) to drop the coins mounted thereon.

The coins on coins-mounted member 216A are picked up through coins opening 201. The discriminator means for discriminating whether or not this coins-picking-up operation is performed includes first and second optical sensors 217A and 217B of the light-passing type for optically detecting the hand of the customer inserted through coins entering and emerging opening 201, said first and second optical sensors 217A and 217B being arranged in coins introducing space 212, and time means 90A (see FIG. 2) for starting its time when the hand of the customer which was once detected by both of optical sensors 217A and 217B is no longer detected, and discriminating that the picking-up of the coins is finished when the hand of the customer is not detected again until its time comes to a predetermined time.

Section 203 includes swingable gate member 226A for selectively allowing coins to slip from the lower end of conveyor passage 204, third drive means 226B for swinging gate member 226 in directions $X_1$ and $X_2$, and box 227 for storing the coins slipping from conveyor passage 204. Only when gate member 226 is swung in direction $X_1$, therefore, coins are allowed to slip from conveyor passage 204. Third optical sensor 227A for optically detecting the collection of those coins which are mistakenly left or forgotten is arranged adjacent to the opening of box 227.

First and second conveyor belts 220 and 221 are stretched, slanting upward along conveyor passage 204, to achieve endless running. That portion of second conveyor belt 221 which is located under coins falling opening 212B serves as holder member 221A for holding coins dropped through opening 212B. The coins dropped onto holder member 221A are conveyed upward by second running conveyor belt 221. Second roller 223 is arranged on the way of second conveyor belt 221 in such a way that it has a clearance, which is equal to the thickness of about one or two coins, relative to the upper surface of second conveyor belt 221. One or two-piled coins which are successively allowed by second roller 223 to pass through between second roller 223 and the upper surface of second conveyor belt 221 are sandwiched between first and second conveyor belts 220 and 221 and conveyed upward. Further, third endless conveyor belt 224 is provided to receive the coins conveyed between conveyor belts 220 and 221 and convey them substantially in the horizontal direction. Third roller 228 is still further provided, rotating in such a way that it has a clearance, which equals the thickness of about one coin, relative to the upper surface of third conveyor belt 224.

Section 205 for storing coins according to their kinds comprises shoot 230 for guiding downward those coins which are fed one by one by the combination of third conveyor belt 224 located above receiving conveyor passage 204 and second coins defining roller 228; discriminator section or electronic discriminator section 231 for discriminating whether or not the coins thus guided can be received, that is, discriminating the kinds, truth and number of these coins; gate section 232 for dividing on the line of coins conveying passage the coins into acceptable ones (or true coins of one yen, one cent, ten yens, one dollar and hundred yens, for example) and unacceptable ones according to the results discriminated by electronic discriminator section 231; discharge shoot 233 for guiding the unacceptable coins downward due to their own weights; section 234 for sorting out the acceptable coins passed through gate section 232 according to their external forms and dimensions, and box 235 for storing the coins every kind of coins according to the results obtained by sorting section 234.

Storing box 235 is partitioned to have region 235A where one cent coins are stored, region 235B where one yen coins are stored, region 235C where hundred yens coins are stored, region 235D where ten yens coins are stored, and region 235E where one dollar coins are stored. Each of regions 235A-235E is provided with a coins pick-up mechanism or well-known disk delivery device 237 for successively picking up the coins one by one and discharging them to paying shoot 236. Arranged at the upper portion of each of paying shoots 236 is first counter means 238 for optically or mechanically counting the number of coins dropped downward.

Arranged at each of regions 235A-235E is first detector means 240 for discriminating the volume of coins in each of regions 235A-235E (or optically detecting that the stored coins have increased to a predetermined volume, for example) and applying a collection signal to control section 90. First detector means 240 serve as collection signal output means which suggest that the coins stored in any of regions 235A-235E should be collected. Also arranged at each of regions 235A-235E is second detector means 241 for discriminating the volume of coins in each of regions 235A-235E (or optically detecting that the stored coins have decreased to a predetermined volume, for example) and applying a supplement signal to control section 90. Second detector means 241 serve as supplement signal output means which suggest that the coins stored in any of regions 235A-235E should be supplemented.

Discharge and collection conveyor passages 207 and 208 comprise fourth conveyor belt 244 whose part is stretched in a U-shape, facing the lower ends of discharge and payment shoots 233 and 236, and endlessly runable in directions $W_1$ and $W_2$; fifth endless conveyor belt 245 opposed to and contacted with the right erected running side of fourth conveyor belt 244; sixth endless conveyor belt 246 opposed to and contacted with the left erected running side of fourth conveyor belt 244; fourth roller 247 located on the right side of fourth conveyor belt 244 at the horizontally running portion thereof and rotated keeping the horizontally running portion of fourth conveyor belt 244 separated from it by an interval which equals to the thickness of one or two coins; and fifth roller 248 located on the left side of fourth conveyor belt 244 at the horizontally running portion thereof and rotated keeping the horizontally running portion of fourth conveyor belt 244 separated from it by an interval which equals to the thickness of one or two coins.

Coins to be discharged and paid are sandwiched and conveyed between fourth and sixth conveyor belts 244 and 246 to coins introducing section 202. Coins to be collected are sandwiched and conveyed between fourth and fifth conveyor belts 244 and 245 to storing section 209. First, second, fourth, fifth and sixth conveyor belts 220, 221, 244, 245 and 246 and second, fourth and fifth rollers 223, 247 and 248 are all driven by first motor 250.

Storing section 209 includes storing box 231 having opening 251A through which the coins sandwiched and conveyed between fourth and fifth conveyor belts 244 and 245 are introduced, and opening 251B through which the stored coins are discharged.

Supplement conveyor passage 210 comprises seventh conveyor belt 252 endlessly stretched to convey the coins, which are introduced into storing box 251, toward discharge opening 251B, keeping them mounted thereon, and sixth roller 253 rotating in such a way that it has such an interval relative to the upper surface of seventh conveyor belt 252 as to equal to the thickness of one or two coins. The supplement coins which are fed through opening 251B are dropped onto third conveyor belt 224 which forms a part of receiving conveyor passage 204, and then advanced. The supplement coins are detected about their kinds and numbers when they pass through electronic detector means 231. Therefore, electronic detector means 231 serves as second counter means for counting the coins to be supplemented.

Figure 7A:
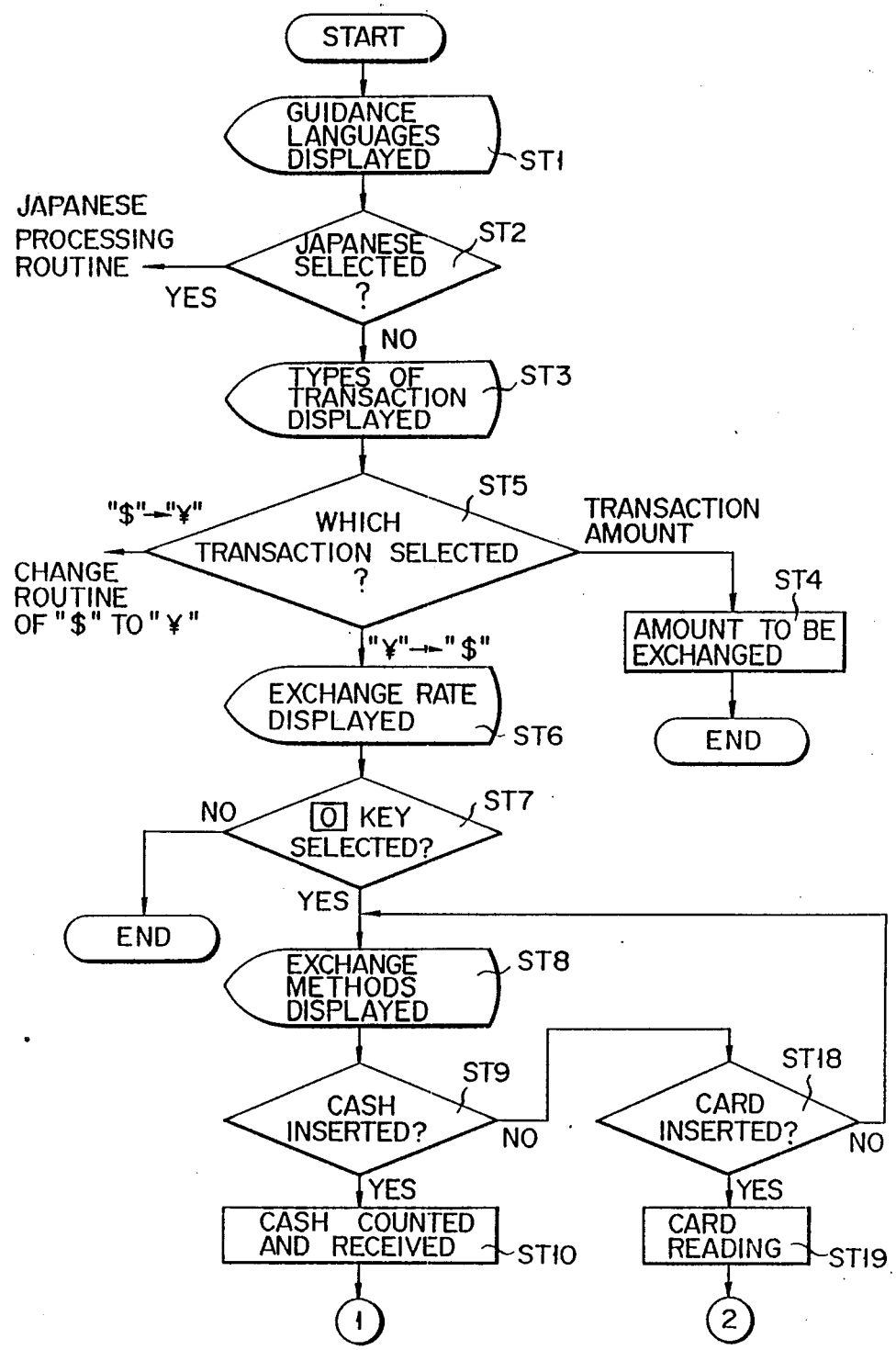
FIGS. 7A and 7B are flow charts for explaining an example of the exchanging operation achieved by the money exchanging machine in FIG. 1.
Figure 7B:
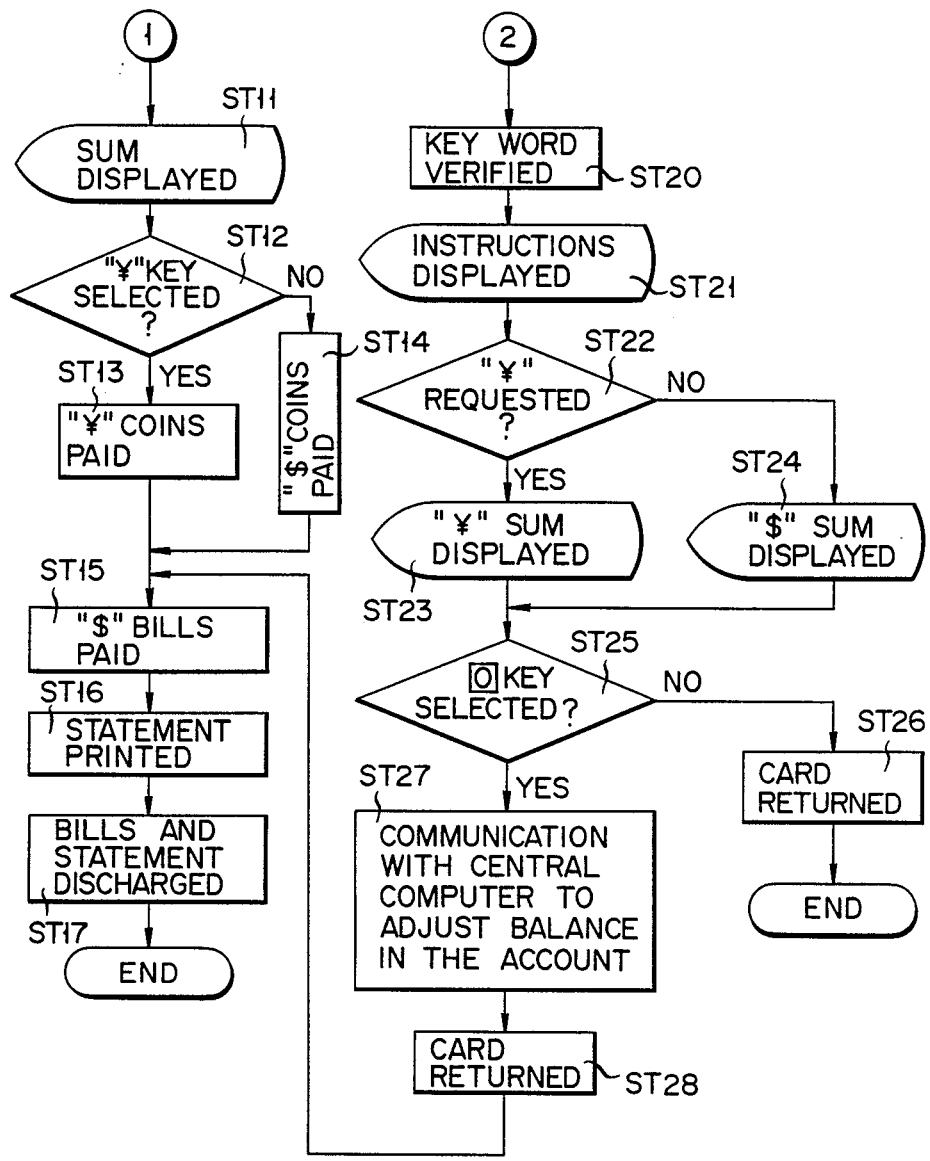

The operation of the money exchanging machine which has the above-described arrangement will be described referring to flow charts shown in FIGS. 7A and 7B. When the money exchanging machine 100 is switched on, it is on-line with central computer 94. The most current exchange rates are thus transmitted from central computer 94 and stored in rate memory 93, thereby making money exchanging machine 100 ready.

Display/input unit 11 is controlled by control section 90 and therefore, guidance languages are displayed on display/input screen 6 this time (step ST1), as shown in FIG. 8A. It is thus selected by the customers whether operating guide is performed in Japanese or in English (step ST2). This is essential when the machines of this type are intended for persons at the international airports, hotels and the like.

It is assumed that the customer selects English. The operation guide will be now displayed in English on display/input screen 6. As shown in FIG. 8B, types of transaction such as exchange ¥ to $, exchange $ to ¥, and transaction amount are displayed in English (step ST3). As for the "transaction amount", the customer can communicate with the machine, using screen section 71a of CRT 71 or display/input screen 6, to determine the transaction amount (step ST4). In the case of overseas travel, for example, the customer inputs countries to visit, order of his stops, days of his stops and the like into the machine. Responsive to these inputs, the machine delivers the customer a statement relating to exchange rates of these countries, limited sums of money with which the customer can come into and out of the countries, amounts of money thought necessary to be exchanged in the countries and the like.

It is assumed that exchange of ¥ to $ is selected (step ST5). AS shown in FIG. 8C, the most current exchange rates, guide message, "o" key for suggesting the customer to carry out the exchange, and "x" key for suggesting the customer to stop the exchange are displayed on display/input screen 6 (step ST6). The exchange rates are per $10 and per ¥10,000. More specifically, the exchange rates are based on the highest sum of bill which the money exchanging machine can process, and they are therefore displayed as yens per $10 and dollars per ¥10,000. It therefore becomes easy to understand how many dollars yens you wish to exchange are exchanged for and how many yens dollars you wish to exchange are exchanged for.

When the customer presses "x" key, the transaction routine is finished and the starting statement is displayed on display/input screen 6, again.

When "o" key is pressed (step ST7), two methods of exchange are displayed on display/input screen 6, as shown in FIG. 8D (step ST8). In a case where the customer wishes to exchange "¥" bills he has, the "¥" bills are directly inserted into bills entering and emerging opening 4 of bills processing unit 9 (step ST9). Coins may be inserted into coins entering and emerging opening 201 of coins processing unit 200.

When the "¥" bills are inserted into bills entering and emerging opening 4, the received bills are successively fed to checking section 20 in bills processing unit 9, as shown in FIG. 3. In this case, ten-dollar bills are previously stored in storing section 17 while ten-thousand-yen bills are also previously stored in storing section 18 of bills processing unit 9, and the transaction requested is to exchange "¥" for "$". Therefore, various kinds of signal patterns relating to the front and back sides of the received bills are compared with reference patterns in the yen denominations reference dictionary by means of discriminator circuit 20a at checking section 20. Only those bills whose patterns are consistent with the reference patterns are fed, as true "¥" bills, to the storing section, but other bills are returned. Only ten-thousand-yen bills of these true "¥" bills which can be used as payable bills in the case of the exchange of "$" to "¥" are stored in ten-thousand-yen bills storing section 18, but other bills are stored in received bills storing section 16 (step ST10).

Figure 8F:
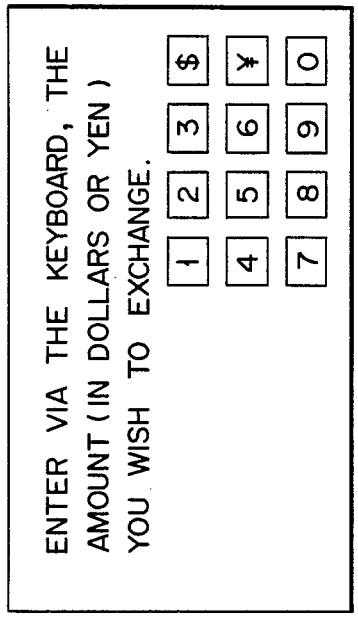
Figure 8E:
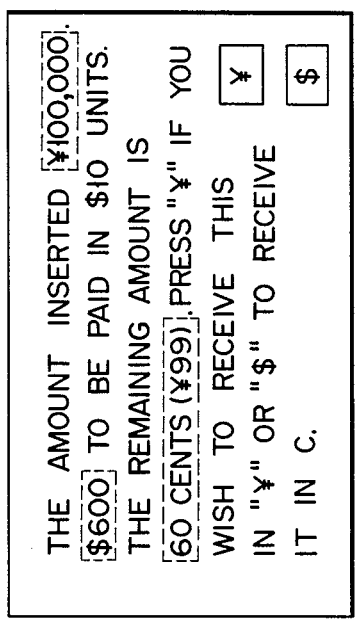

When the storing of the received bills is finished, the sum of received "¥" bills and the sum of paid "$" bills which is obtained when the sum of received "¥" bills is exchanged for "$" bills according to the exchange rates stored in rate memory 93 are displayed on display/input screen 6, as shown in FIG. 8E. At the same time, display/input screen 6 suggests the customer to press "¥" key when he wishes that the remaining amount which cannot be paid in $10 unit is paid in "¥" coins, or to press "$" key when he wishes to receive the remaining amount in cents (step ST11). When "¥" or "$" key is pressed (step ST12), coins processing unit 200 is made operative in response to this instruction and coins equivalent to this remaining amount are discharged in yens or cents step ST13 or ST14). This makes it possible for the customers to make any changes as they wish.

Bills processing unit 9 is also made operative and $10 bills equivalent to the sum of the received "¥" bills are picked up from $10 bills storing section 17 (step ST15). Further, card bankbooks processing unit 10 is also made operative and a statement relating to the above-described transaction is made (step ST16). It is confirmed whether the paid sum is consistent with the instructed sum, and contents of the transaction, the total of received and paid sums, and the like are stored in transaction memory 92, and $10 bills and the statement are discharged to bills opening 4 (step ST17). The transaction is thus finished.

When IC memory card C is inserted into cards/bankbooks opening 5 (step ST18), contents of IC memory card C are read at first by means of cards/bankbooks processing unit 10 (step ST19). The key word inputted through display/input screen 6 by the customer is verified with the one stored (step ST20). When the key word coincides with the one stored, display/input screen 6 suggests the customer to enter the amount he wishes to exchange in dollars or yens via the keyboard (step ST21), as shown in FIG. 8F.

Figure 8H:
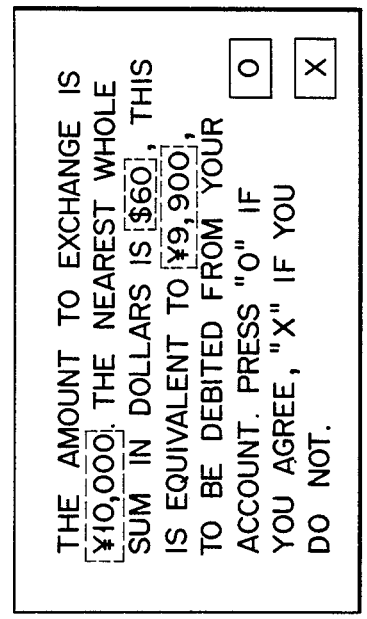
Figure 8G:
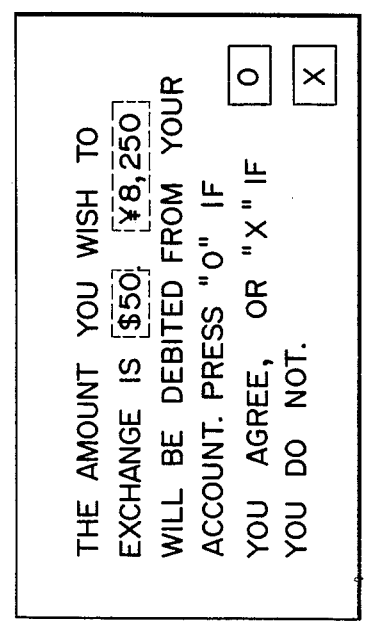

When the amount is instructed in dollars (step ST22), the instructed sum of dollars and the sum of yens which is equivalent to the instructed sum of dollars and which will be debited from the customer's account are displayed on display/input screen 6, while display/input screen 6 suggests the customer to press "o" key when he wishes the transaction to further proceed, but to press "x" key when the does not wish (step ST23), as shown in FIG. 8G. When the amount is instructed in yens (step ST22), the instructed sum of yens, the sum of dollars which is obtained when the instructed sum of yens is exchanged for dollars according to the exchange rates stored in rate memory 93, and the sum of yens which is equivalent to the sum of dollars and which will be debited from the customer's account are displayed on display/input screen 6, while display/input screen 6 suggests the customer to press "o" key when he wishes the transaction to further proceed, but to press "x" key when he does not wish (step ST24), as shown in FIG. 8H.

When "x" key on display/input screen 6 is pressed (step ST25), the transaction is stopped and IC memory card C is returned through cards/bankbooks opening 5 (step ST26). The transaction is thus finished. When "o" key on display/input screen 6 is pressed, control section 90 transmits the sum to be debited and account number to central computer 94 where the sum is debited from the account to adjust the balance (step ST27).

When central computer 94 instructs money exchanging machine 100 to pay the sum of dollars, money exchanging machine 100 confirms whether the paid sum is consistent with the instructed sum or not, contents of the transaction, total of received and paid sums and the like are stored in transaction memory 92 (step ST27), IC memory card C is returned to the customer through cards/ bankbooks opening 5 (step ST28), and bills processing unit 9 is made operative to pay $10 bills equivalent to the instructed sum and the statement through bills opening 4 (step ST15). The transaction is thus finished. When bankbook E is inserted instead of IC card C in this case, contents on the magnetic stripe are read by magnetic head 46, exchange transaction is performed similarly as described above, and contents of this transaction (or debited sum) are printed at a certain blank on the bankbook by means of printing device 47.

As described above, exchange transaction is performed by the insertion of cash bills. In addition, exchange process can be made by the insertion of one of transaction media wherein the amount equivalent to the sum to be exchanged is debited from the account. The money exchanging machine of the present invention thus enables the customers to select any type of transaction. When the customers have no cash, therefore, they can exchange any amount they wish. Further, they can debit the sum of yens, which is equivalent to the sum of dollars they need, from their account. This makes it unnecessary for them to receive a small change, which equals to the remaining amount resulted in the exchange of "¥" to "$" or "$" to "¥". The money exchanging machine can meet various needs of the customers accordingly. The machine enables payment and exchange of yens to be combined with each other, thereby making its operating ability higher and its construction simpler.

Although the exchange transaction of '¥' to "$" has been described, "¥" and "$" are reversed on all operations in the case cf the exchange transaction of "$" to "¥" and similar processes to those described above are performed. Although the English process routine has been described, the Japanese process routine will be carried out when Japanese is selected.

As described above, at least three bills storing sections 16, 17 and 18 are provided. Received bills are sorted according to the kinds of money and thus-sorted bills are stored in these storing sections 16, 17 and 18. Storing sections 17 and 18 are provided with pick up mechanisms 24, by which the received bills can be used as payable bills as well as stored in storing sections 17 and 18. The bills processing unit which serves to receive and pay bills can be thus made as a single unit.

Namely, payable ten-dollar bills and payable ten-thousand-yen bills which can be processed by the money exchanging machine are stored in storing sections 17 and 18, respectively, and other "¥" and "$" bills which cannot be paid are mixedly stored in storing section 16. When "¥" is exchanged for "$", ten-thousand-yen bills are stored in storing section 18 and ten-dollar bills stored in storing section 17 are picked up and paid by pick-up mechanism 24. Ten-dollar bills are stored in storing section 17 while ten-thousand-yen bills stored in storing section 18 are picked up and paid by pick-up mechanism 24 at the time of exchange of "$" to "¥". If the money exchanging machine has three storing sections in minimum, therefore, it can achieve bilateral exchange transactions of "¥" to "$" and "$" to "¥". The machine can be thus made simpler in construction and lower in cost. In addition, its operation can be made easier, thereby enabling the customers to operate it with more easiness.

Further, the exchange transaction of inserting bills, which are equivalent to the amount the customers wish to exchange, into the machine as well as the exchange transaction of debiting the amount, which the customers wish to exchange, from their account can be achieved according to the need of the customers.

More specifically, both of the exchange transactions can be selectively achieved by inserting bills (or sum to be exchanged) into bills opening 4 or by inserting the card or bankbook (or transaction media) Into cards/-bankbooks opening 5. Therefore, the machine can meet various needs of the customers to achieve any transaction the customers wish, and become ready for when the customers have previously prepared such a cash as to equal to the amount they wish to exchange, when they have no cash, when they need small change of "¥" or "$" exchange transactions can be performed without having any cash and they can also be achieved without receiving any unnecessary small change if the customers wish. This enables the customers to operate the money exchanging machine with more easiness.

Furthermore, when the customers enter their needed sum of dollars in "¥" or "$" unit, the sum of dollars can be paid even if "¥" bills they wish to exchange are not inserted into the machine. "¥" bills which is equivalent to the paid "$" sum is debited from the customers' accounts in this case.

More specifically, when yens are to be exchanged for dollars, for example, "yen" bills to be exchanged are not inserted into the machine but needed "dollar" sum is entered in "¥" or "$" unit into the machine via display/input screen 6. The "dollar" sum is thus paid by bills processing unit 9 and the "yen" sum which is equivalent to the paid "dollar" sum is debited from the customers' account. Therefore, the sum to be debited from the account is consistent with the sum to be paid and no difference is caused between the sum to be debited and the sum to be paid. This makes it unnecessary for money exchanging machine 100 to perform such a troublesome change process as to pay the difference by coins smaller than $10 bill which is the smallest "$" unit processed by the machine. The machine can be therefore used as a device provided only with the bills paying function and as a device provided with no coins paying function. The machine can be thus made simpler in construction and in control and lower in cost.

When the machine is made simpler in construction and in control, its operation can be made simpler accordingly. In addition, the customers may not receive any unnecessary change when the amount they exchanged is debited from their account. Besides, when they can enter the amount they wish to exchange in "¥" or "$" unit according to "what sum of yens we want to exchange" or "what sum of dollars we want to exchange", the machine becomes easier for them to operate and more advantageous for them to use.

Still further, the customers can select, as they like, whether coins smaller in sum than a predetermined sum and equivalent to the difference between a sum to be exchanged according to the exchange rates and a sum to be paid should be paid by first or second nation's ones at the time when a certain amount of bills equivalent to the sum to be exchanged is paid.

More specifically, when $10 bills equivalent to the sum of "¥" bills inserted into bills opening 4 are to be paid and when a change smaller in sum than $10 bill and equivalent to the difference between the sum of dollars to be paid and the sum of yens received through bills opening 4 is to be paid in Japanese currency as the customers wish, the change can be paid by one-, ten- and hundred-yen coins, but when the customers wish the change to be paid in U.S. currency, it can be paid by one cent and one dollar coins. This makes it possible to pay the change by any nation's currency the customers wish. Therefore, the machine can be made extremely easier to operate and more advantageous to use.

Still further, the exchange rate based on Japanese money unit and the exchange rate based on U.S. money unit can be displayed.

More specifically, the exchange rate based on 10-dollar and the exchange rate based on ten-thousand-yen can be displayed. When ¥1650 is needed for $10, for example, it can be therefore confirmed at a glance that ¥3300 is needed for the exchange of $20 and that ¥16,500 is needed for the exchange of $100. When ¥10,000 can be exchanged for $60.6, for example, it can be confirmed at a glance that ¥20,000 is exchanged for $121 and that ¥1,000,000 is exchanged for $606. Therefore, the customers can easily understand what yen is needed for the exchange of what dollar, what yen can be exchanged for what dollar, what dollar is needed for the exchange of what yen, or what dollar is exchanged for what yen, thereby enabling the customers to operate the machine with more ease.

Still further, the exchange rate is based not on the fundamental unit of money to be exchanged but on the unit of money which can be processed by the money exchanging machine.

More specifically, the exchange rate based on $10 unit and the exchange rate based on ¥10,000 unit can be displayed. When ¥1650 is needed for the exchange of $10, for example, at the time of the exchange of "¥" to "$", it can be confirmed at a glance that ¥3300 is needed for the exchange of $20 and that ¥16,500 is needed for the exchange of $100. When $60.6 is needed for the exchange of ¥10,000, for example, at the time of the exchange of "$" to "¥", it can be confirmed at a glance that $121 is needed for ¥20,000 and that $606 is needed for ¥100,000. Judging from the unit of money which is used for payment, therefore, the customers can more easily understand that yen is needed for what dollar or what dollar is needed for what yen. This enables the customers to operate the machine with more easiness.

Still further, "¥" and "$" bills are received through bills opening 4, and the bills are checked at checking section 20 and sorted out to various kinds of money, and the thus-sorted bills are stored in storing sections 16, 17 and 18.

More specifically, bills opening 4 of bills processing unit 9 can be made common to at least "¥" and "$" bills. Bills P are therefore inserted only into bills opening 4 at operating face 2. In other words, operating face 2 can be sufficient only to have bills opening 4. Therefore, the bilateral exchange transaction between first and second nation's currencies can be achieved by only one unit of the money exchanging machine. In addition, the operating face can be made simpler in construction and this enables the customers to operate the machine with more easiness.

Although "¥" and "$" have been cited to describe exchange transactions between two nations in the case of the above-described embodiment, the present invention is not limited to the exchange transactions between two nations but it may be applied to exchange transactions between three, four, or more nations. This can be achieved by increasing the number of storing sections in bills processing unit 9 one by one.

Similarly, the present invention is not limited to $10 or ¥10,000 bills. Various kinds of bills can be paid when the number of the storing sections is increased.

When a part of the control section is changed, there can be easily realized an "ATM" having both of ATM/CD and money exchanging functions.

In addition, traveler's checks can be processed instead of bills.

When the exchange transaction is performed by one of transaction media and the amount is debited from the account, it may be performed under off-line state as well as under on-line state. Like the credit cards, the amount will be later debited from the account according to the batch process.

Further, $ bills equivalent to the received sum have been automatically paid when yen is inserted into the machine, but it may be arranged that the sum of $ bills needed is previously instructed in yen or dollar and then displayed.

What is claimed is:

1. A money exchanging machine for exchanging first and second nations' currencies for each other comprising:

means for receiving the first and second nations' currencies, the first nation's currencies including first currencies having a first denomination, the second nation's currencies including second currencies having a second denomination, at least one of the first and second nations' currencies including third currencies, the third currencies being different than the first and second currencies;

first means for storing the first currencies;

second means for storing the second currencies;

third means for storing the third currencies the third currencies in the third storing means not usable as paying currency;

sorting means for sorting out the first and second nations' currencies into the first, second and third currencies, the sorting means transporting the first, second and third currencies to the first, second and third storing means, respectively;

first paying means for paying an amount in the second currencies from the second storing means, the second currencies in the second storing means being usable as paying currency and including the second currencies transported by the sorting means, the amount from the first paying means being equivalent to a calculated total amount of the first currencies when the first currencies are received by said receiving means and sorted by said sorting means; and second paying means for paying an amount in the first currencies from the first storing means, the first currencies in the first storing means being usable as paying currently and including the first currencies transported by the sorting means, the amount from the second paying means being equivalent to a calculated total amount of the second currencies, when the second currencies are received by the receiving means and sorted by the sorting means.

2. The money exchanging machine according to claim 1, further comprising input means for inputting an instruction to execute an exchange transaction of either the second nation's currency to the first nation's currency or the first nation's currency to the second nation's currency; and driving means for selectively driving the first paying means or the second paying means according to the instruction from the input means.

3. The money exchanging machine according to claim 1, further comprising:

means for setting an exchange rate between the first nation's and the second nation's currency;

means for receiving a transaction medium in which account data is stored;

means for demanding an amount in the first nation's currency which is to be exchanged;

means for selecting the insertion of the currency into said currency-receiving means, or the debiting of the amount from the account data stored on the transaction medium; and means for subtracting the amount from a balance of the account when the selecting means selects the debiting of the amount from the account which corresponds to said account data.

4. The money exchanging machine according to claim 3, wherein said first paying means includes a member for paying the amount in the second nation's currency, equivalent to the received amount in the first nation's currency and calculated based on the exchange rate, when the selecting means selects the insertion of bills, the first paying means also including a second member for paying the amount in the second nation's currency equivalent to the demanded amount and calculated based on the exchange rate, when said selecting means selects the debiting the amount from the account.

5. The money exchanging machine according to claim 1, further comprising:
   means for receiving transaction media in which account data is stored;
   means for reading the account information in the transaction media received by the receiving means;
   means for storing a balance of the account corresponding to said account data;
   means for setting an exchange rate between the first nation's and the second nation's currency;
   means for inputting an amount to be debited from the transaction medium, in the first or second nation's currency unit; and
   means of subtracting the amount input by the input means from the balance of the account stored in the memory means.

6. The money exchanging machine according to claim 5, wherein said paying means calculates the amount to be paid in the second nation's currency, based on the exchange rate, and pays the amount in the second nation's currency, when the amount has been input in the first nation's currency by the input means, and also pays the amount in the second nation's currency equivalent to the amount to be paid, when the amount has been input in the second nation's currency by the input means.

7. The money exchanging machine according to claim 6, wherein when an amount to be paid has been input in the first nation's currency by the input means, said substracting means subtracts the amount from the balance of the account stored in said memory means, and when an amount to be paid has been input in the second nation's currency unit by the input means, the substracting means subtracts the amount in the first nation's currency unit calculated according to the exchange rate, from the balance of the account stored in said memory means.

8. The money exchanging machine according to claim 1, further comprising:
   means for setting an exchange rate between the first nation's and the second nation's currency;
   means for specifying an amount to be exchanged in the first nation's currency; and
   means for selecting whether an amount smaller than a predetermined value and equivalent to the difference between the amount to be exchanged and the amount to be paid, calculated based on the exchange rate, is paid in the first or the second nation's currency, when the amount equivalent of the amount to be exchanged is paid by the paying means.

9. The money exchanging machine according to claim 8, wherein said paying means includes:
   a paying member for exchanging an amount specified in the first nation's currency by the specifying means for the equivalent in the second nation's currency, in accordance with the exchange rate, and paying the equivalent amount in the second nation's currency; and
   a paying member for paying the amount equivalent to the difference currency, in response to the selection of the selecting means.

10. The money exchange machine according to claim 1, further comprising:
    means for setting an exchange rate between the first nation's and the second nation's currency;
    means for displaying the total amount of the currencies to be paid; and
    inputting means for selecting whether to advance a next step or to return a preceding step, according to the displayed total amount.

11. A money exchanging machine for exchanging first and second nation's currencies for each other, comprising:
    means for setting an exchange rate between the first and the second nation's currencies;
    means for displaying an amount in the first nation's currency and an equivalent to this amount in the second nation's currency calculated based on the exchange rate, and also an amount in the second nation's currency and the equivalent to this amount in the first nation's currency calculated based on the exchange rate;
    means for receiving the first and second nations' currencies, the first nation's currency including first currencies usable as paying currency, the second nation's currencies including second currencies usable as paying currency, at least one of the first and second nations' currencies including third currencies, the third currencies being different than the first and second currencies and not usable as paying currency;
    first paying means for paying an amount in the second currencies equivalent to an amount in the first currencies when the first currencies are received by the receiving means, the first paying means receiving the second currencies from the receiving means when the second currencies are received by the receiving means; and
    second paying means for paying an amount in the first currencies equivalent to an amount in the second currencies when the second currencies are received by the receiving means, the second paying means receiving the first currencies when the first currencies are received by the receiving means.

12. The money exchanging machine according to claim 11, wherein said displaying means includes a member for displaying the exchange rate in the currency in which an amount is to be paid by the paying means.

13. A money exchanging machine for exchanging first and second nations' currencies for each other comprising:
    means for receiving the first and second nations' currencies, the first nation's currencies including first currencies having a first denomination, the second nation's currencies including second currencies having a second denomination, at least one of the first and second nations' currencies including third currencies, the third currencies being different that the first and second currencies;
    first means for storing the first currencies;
    second means for storing the second currencies;
    third means for storing the third currencies;
    sorting means for sorting out the first and second nations' currencies into the first, second and third currencies, the sorting means transporting the first, second and third currencies to the first, second and third storing means, respectively;

first paying means for paying an amount in the second currencies from the second storing means, the amount from the first paying means being equivalent to a calculated total amount of the first currencies when the first currencies are received by said receiving means and sorted by said sorting means; and second paying means for paying an amount in the first currencies from the first storing means, the amount from the second paying means being equivalent to a calculated total amount of the second currencies, when the second currencies are received by the receiving means and sorted by the sorting means; and means for selecting whether a remaining amount after exchanging is to be paid in the first nation's currency or in the second nation's currency.

14. The money exchange machine according to claim 13, further comprising:

means for setting an exchange rate between the first nation's and the second nation's currency;

means for displaying the total amount of the currencies to be paid; and inputting means for selecting whether to advance a next step or to return a preceding step, according to the displayed total amount.

15. A money exchanging machine for exchanging first and second nation's currencies for each other, comprising:

means for setting an exchange rate between the first and the second nation's currencies;

means for displaying an amount in the first nation's currency and an equivalent to this amount in the second nation's currency calculated based on the exchange rate, and also an amount in the second nation's currency and the equivalent to this amount in the first nation's currency calculated based on the exchange rate;

means for receiving the first and second nations' currencies, the first nation's currency including first currencies, the second nation's currencies including second currencies;

first paying means for paying an amount in the second currencies equivalent to an amount in the first currencies when the first currencies are received by the receiving means; and second paying means for paying an amount in the first currencies equivalent to an amount in the second currencies when the second currencies are received by the receiving means; and means for selecting whether a remaining amount after exchanging is to be paid in the first nation's currency or in the second nation's currency.

16. The money exchange machine according to claim 15, further comprising:

means for setting an exchange rate between the first nation's and the second nation's currency;

means for displaying the total amount of the currencies to be paid; and inputting means for selecting whether to advance a next step or to return a preceding step, according to the displayed total amount.

17. A money exchanging machine for exchanging first and second nations' currencies for each other, comprising:

means for receiving the first and second nations' currencies, the first nation's currencies including first currencies having a first denomination, the second nation's currencies including second currencies having a second domination, the first and second nation's currencies respectively including third and fourth currencies, the third and fourth currencies being different than the first and second currencies;

first means for storing the first currencies;

second means for storing the second currencies;

third means for storing the third and fourth currencies;

sorting means for sorting out the first and second nations' currencies into the first, second, third, and fourth currencies, the sorting means transporting the first and second currencies to the first and second storing means, respectively, and the third and fourth currencies to the third storing means the third and fourth currencies not usable as paying currency;

first paying means for paying an amount in the second currencies from the second storing means, the second currencies in the second storing means being usable as paying currency and including the second currencies transported by the sorting means, the amount from the first paying means being equivalent to a calculated total amount of the first currencies when the first currencies are received by said receiving means and sorted by sorting means; and second paying means for paying an amount in the first currencies from the first storing means, the first currencies in the first storing means being usable as paying currency and including the first currencies transported by the sorting means, the amount from the second paying means being equivalent to a calculated total amount of the second currencies when the second currencies are received by said receiving means and sorted by sorting means.

* * * * *